United States Patent [19]
Moroto et al.

[11] Patent Number: 5,893,894
[45] Date of Patent: Apr. 13, 1999

[54] APPARATUS FOR CONTROLLING AN AUTOMATIC TRANSMISSION OF AN AUTOMOBILE AND METHOD THEREOF

[75] Inventors: Shuzo Moroto; Takahiro Iwami; Mitsugi Yamasita; Hideki Nakashima, all of Aichi-ken, Japan

[73] Assignee: Kabushikikaisha Equos Research, Japan

[21] Appl. No.: 08/805,110

[22] Filed: Feb. 24, 1997

[30] Foreign Application Priority Data

Feb. 23, 1996 [JP] Japan .................. 8-061917
Feb. 28, 1996 [JP] Japan .................. 8-069291

[51] Int. Cl.$^6$ .................. G06G 7/78; G06F 19/00
[52] U.S. Cl. .................. 701/53; 701/51; 701/55; 701/202; 701/208
[58] Field of Search .................. 701/51, 52, 53, 701/60, 61, 62, 66, 65, 64, 56, 55, 200, 202, 208, 209, 23, 25, 26; 477/45, 81, 65, 120, 905, 121; 74/335, 336 R, 473.18, 625

[56] References Cited

U.S. PATENT DOCUMENTS

| | | | |
|---|---|---|---|
| 4,679,147 | 7/1987 | Tsujii et al. .................. | 701/211 |
| 5,146,219 | 9/1992 | Zechnall .................. | 701/1 |
| 5,229,941 | 7/1993 | Hattori .................. | 701/26 |
| 5,371,678 | 12/1994 | Nomura .................. | 701/117 |
| 5,504,482 | 4/1996 | Schreder .................. | 701/213 |
| 5,539,397 | 7/1996 | Asanuma et al. .................. | 701/208 |
| 5,716,301 | 2/1998 | Wild et al. .................. | 701/23 |

*Primary Examiner*—Jacques H. Louis-Jacques
*Attorney, Agent, or Firm*—Lorusso & Loud

[57] ABSTRACT

An apparatus for controlling an automatic transmission of an automobile and a method therefor utilize a route guidance system. The apparatus includes a memory which stores road information, a detector for detecting a specific position which is located on a planned driving route from the road information stored in the memory; a position detector for detecting the present position of the automobile; a speed detector for detecting the speed V of the automobile; a sensor for detecting an opening degree $\theta$ of a throttle of the automobile; a computer for computing a distance "d" between the detected automobile position and the detected specific position; a driving operation detector for detecting an operation by the driver of the automobile; a first gear ratio selecting device for selecting a first gear ratio for the automatic transmission based on the detected speed V and the detected throttle opening degree $\theta$; and a second gear ratio selecting device for selecting a second gear ratio based on the detected speed V, the distance "d", the detected operation by the driver and the first gear ratio selected by the first gear ratio selecting device. As a result, it is possible to carry out gear change control taking anticipated changes in the driving conditions into account, thus enabling smooth and comfortable driving. Further, since the driver of the automobile can have advance voice notice of control operations, it is possible to avoid confusion caused by sudden unexpected changes.

19 Claims, 6 Drawing Sheets

FIRST TABLE (PATTERN)

APPARATUS FOR CONTROLLING AN AUTOMATIC TRANSMISSION OF AN AUTOMOBILE AND METHOD THEREOF

BACKGROUND OF THE INVENTION

1. Field of the Invention

The present invention relates to an apparatus for controlling an automatic transmission of an automobile and a method thereof, and in particular relates to apparatus and method of controlling gear changes in an automatic transmission of an automobile equipped with a route guidance system, in which road information obtained from the route guidance system is used for controlling the automatic transmission.

2. Description of the Prior Art

One example of a prior art apparatus for controlling gear changes in an automatic transmission of an automobile based on information obtained from a route guidance system is disclosed In Japanese Laid-Open Patent Publication No. HEI 6-272753, in which the gear change control apparatus controls gear changing operations to automatically change gears so as to be suitable for the present driving conditions, based on the information obtained from the route guidance system and road information which has been previously prepared. In this prior art, gear change control apparatus, a gear change table (gear change pattern) is quickly established so as to be suitable for the present driving conditions based on the information obtained from the route guidance system and the road information, and then appropriate gear changes (i.e., changes in gear ratio) are carried out in accordance with the established gear change table.

Another example of such a prior art gear change control apparatus is disclosed in Japanese Patent Publication No. 6-58141, in which gear change control for an automatic transmission is also carried out based on information obtained from a route guidance system and road information that has been previously prepared.

However, in these prior art apparatuses, gear changes are carried out based on the information on the present driving conditions of the automobile that is obtained from the road information related to the detected present position. For example, when the automobile approaches an upgrade, the gear change control apparatus begins operations to effect a change of gears at the point in time when the automobile enters the upgrade. Further, when the automobile approaches a curved section of a road, the gear change control apparatus begins operations to effect a change of gears at the point in time when the automobile approaches the curved section of the road. Therefore, these prior art gear change control apparatuses can not take anticipated changes in the driving conditions into account when carrying out such gear change control operations.

SUMMARY OF THE INVENTION

Accordingly, an object of the present invention is to provide an apparatus for controlling an automatic transmission of an automobile and a method for controlling the automatic transmission which can realize smooth and comfortable driving of an automobile by controlling change of gears in the automatic transmission taking anticipated changes in the driving conditions into account.

Another object of the present invention is to provide an apparatus for controlling an automatic transmission of a automobile and a method for controlling the automatic transmission which can prevent the driver of the automobile from becoming confused by sudden, unexpected changes in gears, by giving the driver an advance voice notice informing that a controlled operation such as change of gears is to be carried out before such operation is carried out.

In order to achieve these objects, the present invention is directed to an apparatus for controlling an automatic transmission of an automobile, which comprises:

road information storing means which stores information concerning roads;

specific position detecting means for detecting a specific position, which is located on a planned driving route, from the road information stored in the road information storing means;

position detecting means for detecting present location of the automobile;

speed detecting means for detecting speed of the automobile;

throttle opening degree detecting means for detecting degree of opening θ of a throttle of the automobile;

distance computing means for computing a distance "d" between the detected automobile present location and the detected specific position;

driving operation detecting means for detecting an operation made by the driver of the automobile;

first gear ratio selecting means for selecting a first gear ratio of the automatic transmission of the automobile based on the detected speed V of the automobile and the detected throttle opening degree θ; and second gear ratio selecting means for selecting a second gear ratio based on the detected speed V of the automobile, the distance "d", the detected operation by the driver and the first gear ratio selected by the first gear ratio selecting means.

Another aspect of the present invention is directed to an apparatus for controlling an automatic transmission of an automobile, which comprises:

road information storing means which stores information concerning roads;

specific position detecting means for detecting a specific position, which is located on a planned driving route, from the road information stored in the road information storing means;

position detecting means for detecting a present location of the automobile;

speed detecting means for detecting the speed V of the automobile; and a control device for computing a distance "d" between the detected automobile present location and the detected specific position and for setting an appropriate gear ratio in the automatic transmission based on the information concerning the detected speed V of the automobile and the detected distance "d".

Yet another aspect of the present invention is directed to a method of controlling an automatic transmission of an automobile, comprising the steps of:

obtaining a distance "d" between a specific position which is located on a planned driving route and the detected present location of the automobile;

selecting an appropriate gear ratio for the automatic transmission of the automobile based on the speed V of the automobile and the distance "d";

determining whether or not the present gear ratio of the automatic transmission should be changed; and executing a gear shift to the selected gear ratio, responsive to a positive determination of need for a gear change.

The present invention makes it possible to carry out gear change control taking anticipated changes in the, driving conditions into account, and this makes it possible to achieve smooth and comfortable driving oat the automobile.

Further, in order to achieve these objects, it is preferred that the apparatus further comprises notifying means for notifying the driver of a change of the gear ratio before such a change is carried out. In this case, it is preferred that the notification of the change of the gear ratio be by voice. Accordingly, a preferred embodiment of the method of the present invention likewise includes, responsive to a determination that the gear ratio should be changed, notifying the driver of the change of the gear ratio in advance; and then executing a gear change to the selected gear ratio.

In this case, it is preferred that the notification be a voice message.

In this way, it is possible to notify the driver in advance of a control operation such as a change of gears, thus avoiding confusion which might otherwise be caused by sudden unexpected changes in gears and enabling smooth and comfortable driving.

It is also preferred that the apparatus further comprises driving route search means for determining a desired driving route to a destination based on search of the information stored in the road information storing means. By providing such a driving route search means, it is possible to set the planned driving route more desirably and appropriately.

Furthermore, it is also preferred that the driving operation detecting means is an accelerator sensor for detecting operation of an accelerator pedal by the driver; a brake sensor for detecting operation of a brake pedal by the driver; and a blinker sensor for detecting operation of a blinker by the driver. In this manner, it becomes possible to achieve more appropriate gear change control in response to the driving operations by the driver, such as operation of this accelerator, brake and blinker and the like.

Moreover, it is also preferred that the second gear ratio selecting means is operated so as to select an appropriate gear change table from a plurality of gear change tables which have been previously prepared for selection of an appropriate gear ratio, and then select the second gear ratio by reference to the selected gear change table. In this case, it is particularly preferred that the selection of the gear change table is carried out based on the driving operation detected by the driving operation detecting means.

Furthermore, it is also preferred that the first gear ratio selecting means determines the first gear ratio based on a gear change table which has been previously prepared for selecting an appropriate gear ratio; and that the second gear ratio selecting means selects a gear change table from a plurality of gear change tables which have been previously prepared for selecting an appropriate gear ratio, and then selects the second gear ratio according to the selected gear change table and determines whether or not a gear change should be carried out by comparing the first gear ratio and the second gear ratio.

In this way, the present invention makes it possible to select the proper gear ratio and to appropriately determine whether or not the present gear should be changed.

It is also preferred that the apparatus further comprises a voice output device, in which the second gear ratio selecting means causes the voice output device, before the change of the gear ratio, to notify the driver of such a change of the gear ratio, and then outputs a shift change signal to the first gear ratio selecting means. Further, it is particularly preferred that the first gear ratio selecting means outputs a gear change command signal to the automatic transmission in response to the inputted shift change signal.

In this arrangement, the second gear ratio selecting means may have a function that anticipates driving conditions after passing the specific position and then sets a proper gear ratio suitable for the anticipated driving conditions. By constructing the control apparatus in this ways, since a proper gear change control is carried out after passing the specific position, even smoother driving can be performed.

In another of its aspects the present invention is also directed to an apparatus for controlling an automatic transmission of an automobile, comprising:

determining means for determining conditions of various portions of the automobile;

control means for performing control operations in response to the determination made by the determining means; and notifying means for notifying the driver of a control operation of the control means, wherein the notification is given before the control operation is carried out.

In yet another aspect the present invention is directed to an apparatus for controlling an automatic transmission of an automobile, comprising:

determining means for determining conditions of various portions of the automobile based on anticipated driving conditions;

control means for performing control operations for changing the driving conditions of the automobile in response to the determination made by the determining means; and notifying means for notifying the driver of a control operation of the control means, wherein the notification is given before the determining means outputs the result of the determination to the control means.

In the above, it is preferred that the notifying means includes a voice output device which generates voice messages. By constructing the control apparatus in this way, since it is possible to notify a driver that the control operation is about to be executed by a voice message before such operation is carried out, smooth and comfortable driving of the automobile is further enhanced.

Other objects, features and advantages of the present invention will become apparent from the following descriptions of the preferred embodiments taken in conjunction with the appended drawings.

DETAILED DESCRIPTION OF THE PREFERRED EMBODIMENTS

With reference to the appended drawings, a detailed description of the preferred embodiments of an apparatus and a method of controlling an automatic transmission of an automobile according to the present invention will now be described below.

Figure 1:
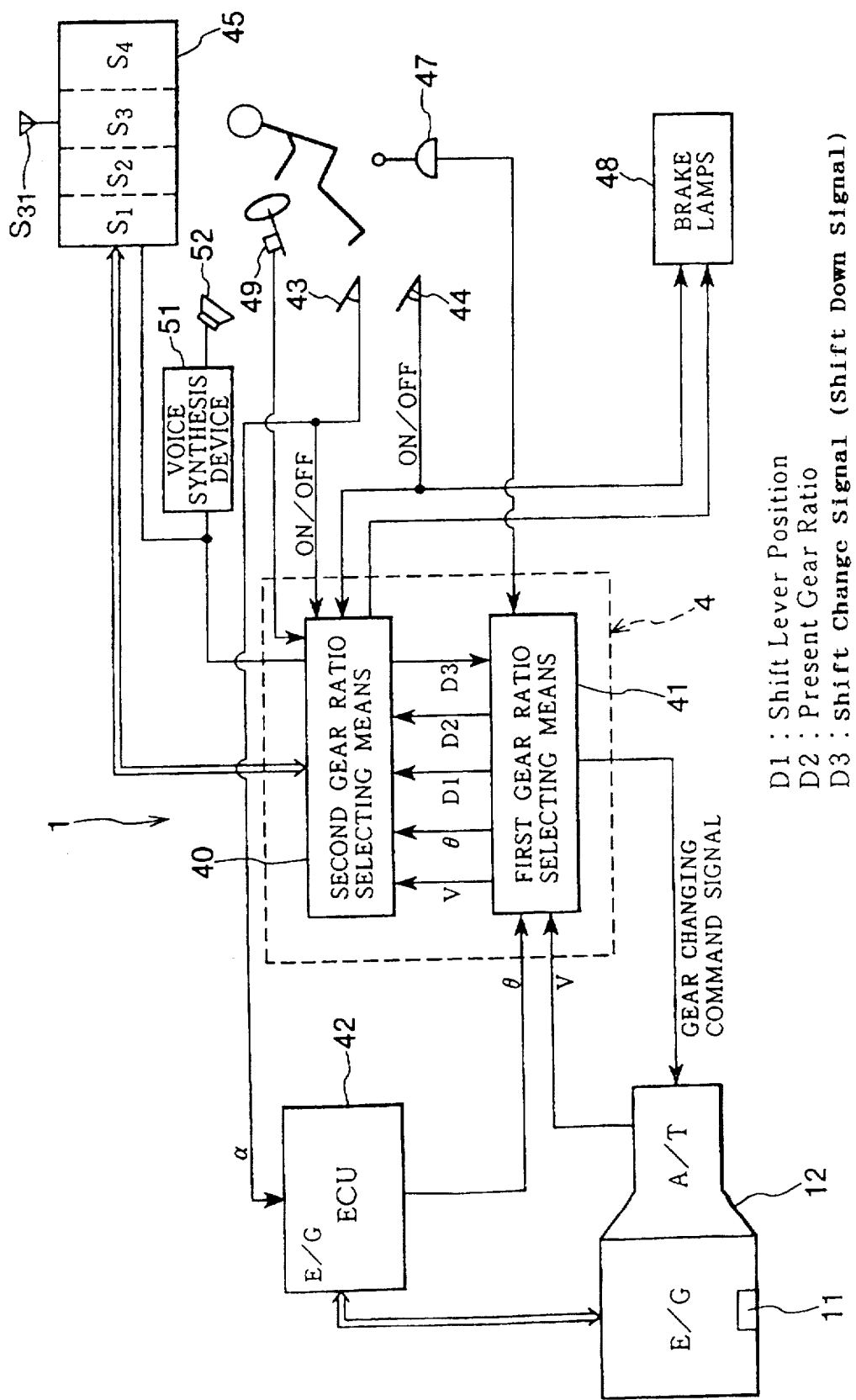
FIG. 1 is a block diagram showing the structure of an apparatus for controlling an automatic transmission of an automobile according to the present invention.

FIG. 1 is a block diagram showing the structure of a preferred embodiment of an apparatus for controlling an automatic transmission of an automobile according to the present invention. As shown in this drawing, the control apparatus 1 includes a main control device 4, an engine main control unit 42, an accelerator sensor 43, a brake sensor 44, an automobile guiding device 45, a shift lever position sensor 47 for detecting the operating position of a shift lever, a blinker sensor 49 for detecting the operation of blinkers, and a voice output device 5 which functions as a notifying means.

The main control device 4 includes a first gear ratio selecting means 41 and a second gear ratio selecting means 40, both of which function as determination means. Each of the first and second gear ratio selecting means 41, 40 includes a microprocessor to enable various signals (described below) to be sent and received therebetween.

The accelerator sensor 43 provides information concerning the accelerator opening degree α to the engine control unit 42. The engine control unit 42 causes an appropriate amount of fuel to be supplied to the engine in accordance with the inputted accelerator opening degree α. Further, the accelerator sensor 43 provides an ON/OFF signal, indicating whether or not the accelerator pedal is being actuated, to the second gear ratio selecting means 40.

The brake sensor 44 provides an ON/OFF signal indicating whether or not the brake pedal is being actuated to the second gear ratio selecting means 40. Thus, when the brake pedal is actuated, that is when an ON signal is output from the brake sensor 44, a brake lamp 48 is turned on.

In accordance with the inputted accelerator opening degree α, the engine control unit 42 controls the throttle opening degree θ; that is, the engine control unit 42 adjusts the amount of fuel supplied to the engine in order to control the output of the engine. Further, at the same time, the engine control unit 42 provides the first gear ratio selecting means 41 with information related to the throttle opening degree θ which is determined based on the inputted accelerator opening degree α.

The shift lever position sensor 47 detects the operating position of the shift lever, for example, whether the position of the shift lever is in Drive Range (D), First Gear Range, Second Gear Range, Third Gear Range, Reverse (R), Neutral (N) or Parking (P), and then provides the first gear ratio selecting means 41 with such shift lever position information.

Further, an automatic transmission 12 is provided with a built-in automobile speed sensor 11 which acts as an automobile speed detection means. In this regard, information related to the automobile speed V output by this sensor 11 is input into the first gear ratio selecting means 41.

As the automobile speed sensor 11, it is possible to use a sensor which detects the speed of rotation of the drive axle of the automatic transmission 12 (which corresponds to the speed of rotation of the wheels).

The first gear ratio selecting means 41 and the second gear ratio selecting means 40 are respectively provided with built-in memories (ROM) not shown in the drawings. The memory of the first gear ratio selecting means 41 stores the gear change table (pattern) shown in FIG. 2 in the form of numerical data and the memory of the second gear ratio selecting means 40 stores the gear change tables (patterns) shown in FIGS. 3–5 in the form of numerical data.

With regard to the gear change tables shown in FIGS. 2–5, it is to be noted that these tables are prepared based on the assumption that the first gear has a gear ratio of 2.804, the second gear has a gear ratio of 1.531, the third gear has a gear ratio of 1.000 and the fourth gear has a gear ratio of 0.705. However, it goes without saying that the gear ratios of these gears are not limited to these specific values, and any desired gear ratios can be allotted to the respective gear stages.

As it is seen from the above description, the gear ratios have reverse relationship with the gear stages such as first, second, third and fourth gears. Namely, the smallest gear stage, that is the first gear, has the largest gear ratio and the largest gear stage is the fourth gear which has the smallest gear ratio.

Further, in these tables, the solid lines represent cases in which a normal fluid clutch is being operated (i.e., cases in which a lockup clutch (L/U) is not being operated), and the dashed lines represent cases in which a lockup clutch (L/U) is being operated.

Figure 2:
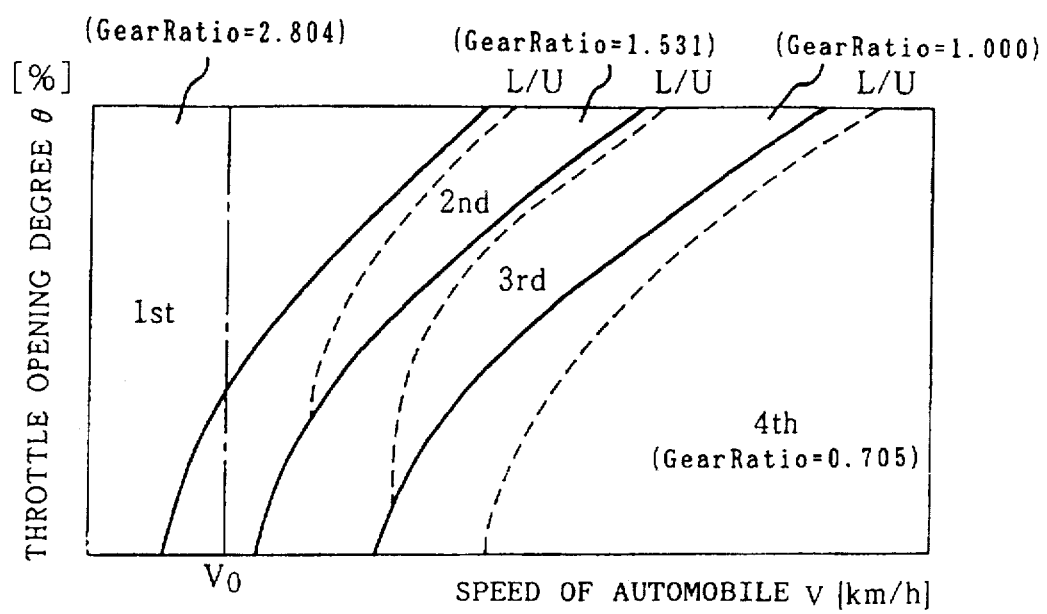
FIG. 2 shows a gear change table for normal driving conditions.

Furthermore, it is also to be noted that even though the gear change table in FIG. 2 shows the case for shifting up, this table is also used for shifting down by partially or entirely shifting each of the curves shown in FIG. 2 to the left by a predetermined amount so that each of these curves is given a prescribed hysteresis.

In this way, the first gear ratio selecting means 41 controls the gear change of the automatic transmission 12 based on data stored in the memory of the first gear ratio selecting means 41. Namely, in the case where the shift lever position sensor 47 outputs a signal indicating that the shift lever is in the "D" position, the first gear ratio selecting means 41 determines the first gear ratio based on the data for the throttle opening degree θ inputted from the engine control unit 42 and the data for the automobile speed V inputted from the automatic transmission 12 in accordance with the previously stored gear change table shown in FIG. 2, and then outputs gear change command signals to the automatic transmission 12 in order to change the present gear stage to thus determined gear stage.

Further, in the case where a shift change signal (shift down signal which is indicated by "D3" in FIG. 1) is output by the second gear ratio selecting means 40, the first gear ratio selecting means 41 outputs a gear change command signal to the automatic transmission 12 to change the present gear stage to the gear stage indicated by thus inputted shift change signal.

Furthermore, the first gear ratio selecting means 41 outputs information related to the automobile speed V, the throttle opening degree θ, the shift lever position (indicated by "D1" in FIG. 1) and the present gear stage being used (the first gear ratio) (indicated by "D2" in FIG. 1) to the second gear ratio selecting means 40.

The automobile guiding device 45 is a device which uses a route guidance system utilizing satellite communications (GPS Global Positioning System), and it is equipped with a storage device S1 which acts as a road information storing means for storing road information, a specific position detecting device S2 which acts as a specific position detecting means, an automobile position recognizing device S30, a satellite communications device S31 and a computing devices S4 which acts as a distance computing means.

The storage device S1 can be one of various storage mediums, such as photo recording mediums, photomagnetic recording mediums, magnetic recording mediums, IC memory cards and the like, and in the present embodiment a CD-ROM or IC memory card is used.

In the storage device S1, various items of road information such as the width, grade, surface conditions and radius of curves of the road and the like are stored. Further, such road information is stored as a group of virtual nodes previously set on the road and a group of links which connect these nodes. Each of these nodes is determined by absolute or relative coordinates.

Once the destination is inputted, the automobile guiding device 45 automatically carries out a search to determine the optimum route (recommended route) from the point of departure to the destination, with this route being established as a planned driving route. This planned driving route is determined by calculations performed by the computing device S4 based on the nodes and the links. It is possible to manually change or revise such a planned driving route.

In this connection, it should be noted that in the following description, the language "planned driving route" is used as follows. Namely, when an automobile driving route has been automatically or manually established in advance, the planned driving route means such a preestablished driving route. On the other hand, when no driving routes has yet been established the planned driving route means a route on which the automobile is expected to pass in the case where the automobile proceeds forward from the present position, that is a route which lies in the forward direction of the automobile.

The specific position detecting device S2 detects specific positions that are positioned along the planned driving route from the road information stored in the storage device S1 and specifies the coordinates of such specific positions. These specific positions are places where it is necessary to reduce speed or downshift the gear stage. Examples of such specific positions include intersections, T-shaped intersections, places where the number of traffic lanes is reduced, entry points to curves, train crossings, expressway off ramps, expressway tollgates, places where the width of road becomes narrow, upgrades and downgrades and the like. From among all these specific positions a position which is closest to the present position of the automobile is designated as the specific position.

The automobile position recognizing device S30 and the satellite communications device S31 constitute an automobile position detecting means. The automobile position recognizing device S30 recognizes the present position of the automobile based on information which is inputted from the satellite communications device S31 and shows the absolute present position of the automobile.

Further, the computing device S4 computes the distance "d" between the specific position and the position of the automobile.

In this way, information related to the actual distance "d" between the specific position and the position of the automobile and various items of road information stored in the storage device S1 are supplied to the second gear ratio selecting means 40 from the automobile guiding device 45.

Now, when the automobile reaches a point (hereafter referred to as the "judgement point") where the actual distance "d" between the specific position and the position of the automobile becomes equal to a predetermined distance "D", a shift change judgement is begun by the second gear ratio selecting means 40. Namely, a desired gear change table (pattern) is selected from the first through third gear change tables (patterns) shown in FIGS. 3–5 in accordance with signals fed from the sensors 43, 44, 49, and then the appropriate gear to be established (second gear ratio) is determined from the actual distance "d" from the automobile position to the specific position and the automobile speed V by reference to the selected gear change table. Then, the second gear ratio selecting means 40 compares the second gear ratio with the first gear ratio which has been determined by the first gear ratio selecting means 41 to make a determination as to whether or not a gear change is needed. If it is determined that a downshift is required, a shift change signal (shift down signal) is outputted to the first gear ratio selecting means 41 from the second gear ratio selecting means 40.

In this case, the predetermined distance "D" for identifying the judgement point is set to allow a sufficient time for the automobile to be slowed down by means of such a downshifting operation. Further, it is possible to change the distance "D" so as to be suitable for the speed limit of the road. For example, in the case where the automobile is traveling on an expressway which has a high speed limit, the distance "D" can be made longer, while in the case where the automobile is traveling on an urban road which has a low speed limit, the distance "D" can be made shorter.

When it is determined that a downshift is to be carried out, the second gear ratio selecting means 40 outputs a shift change signal, but before outputting such a signal, the second gear ratio selecting means 40 first outputs a signal to the voice output device 5 to perform voice guidance. Then, based on such a signal, the voice output device 5 gives the driver of the automobile advance notice of such a downshifting operation.

The voice output device 5 Includes a voice synthesizing device 51 and a speaker 52. The voice synthesizing device 51 synthesizes a voice output for announcing to the driver the downshifting operation based on the signal supplied from the second gear ratio selecting means 40, so that such a voice output is emitted into the inside of the automobile by means of the speaker 52.

As was described above, the second gear ratio selecting means 40 first determines whether or not the automobile has passed the judgement point "G", and in the case where it is determined that the automobile has already passed the judgement point "G", a gear change table is selected based on the information related to the driving operations performed by the driver. Then, downshifting is successively carried out in accordance with the selected gear change table to reduce the speed of the automobile to a predetermined speed until the automobile reaches the specific position.

Figure 6:
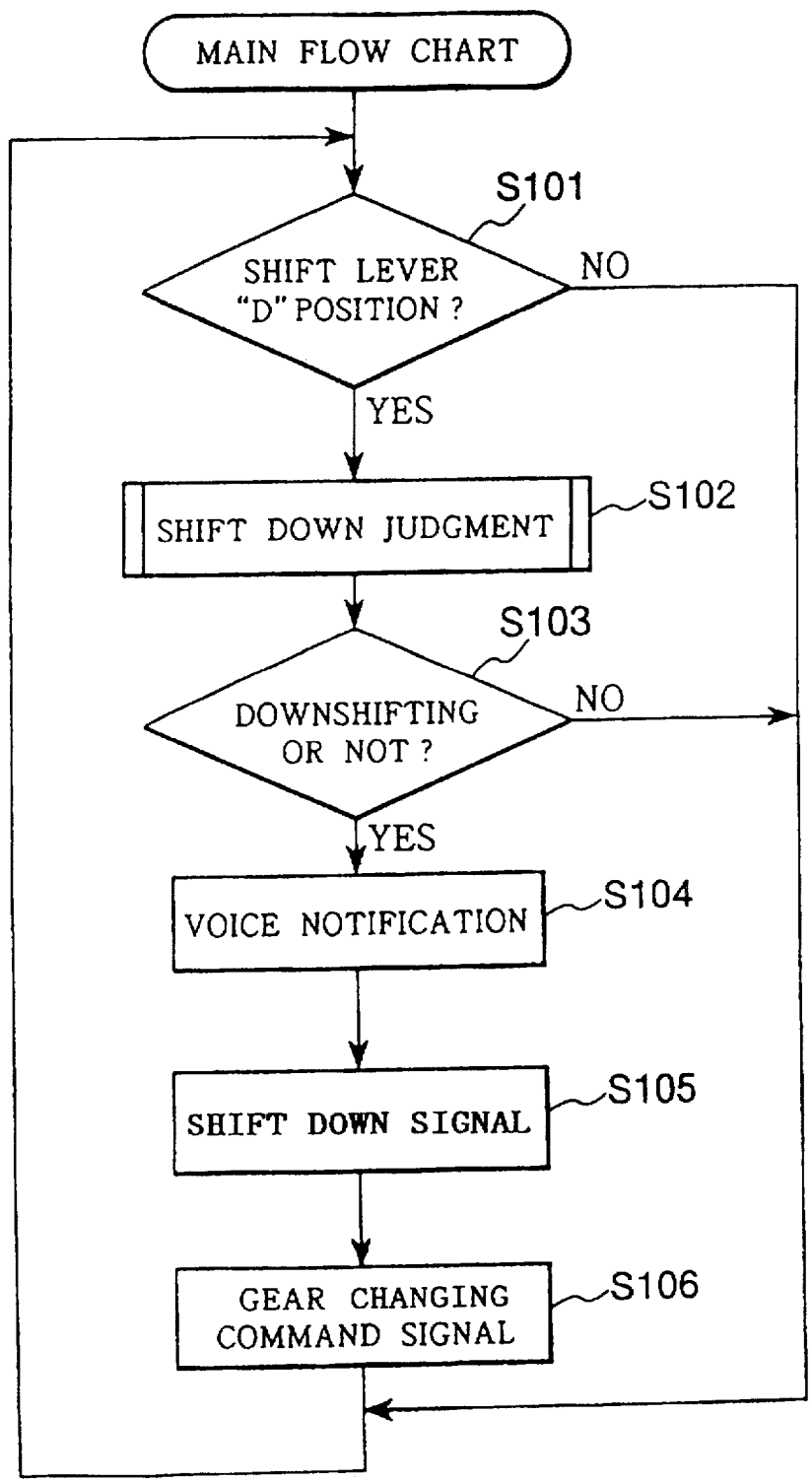
FIG. 6 is a flow chart of a main routine for shift control.

Next, the control operations of the second gear ratio selecting means 40 will be described with reference to the flow charts shown in FIGS. 6 and 7. In this connection, FIG. 6 illustrates a flow chart of the main routine for operation of the second gear ratio selecting means 40.

First, the shift lever position sensor 47 is used to determine whether or not the shift lever is in the "D" position (i.e., the Drive position) (Step S101).

In the case where the shift lever is not in the Drive position, the control operations described below are not carried out. On the other hand, in the case where the shift lever is in the Drive position, the process proceeds to the shift down judgement routine shown in FIG. 7 (Step S102 in the main routine of FIG. 6).

Next, in the shift down judgement routine (Step S102), a judgement is made to determine whether or not downshifting is to be performed (Step S103). If It is determined that downshifting is not to be made, the control operations described below are not carried out.

Now, in the case where it is judged that a downshift operation is to be made in the downshift judgement routine (Step S102), a signal is outputted to the voice output device 5, and then based on this signal the voice output device 5 emits a synthesized voice to announce to the driver that a downshift operation is about to take place (Step S104). In this way, by giving the driver advance notice of the downshift operation, it is possible to eliminate a sudden unexpected reduction in speed, thereby providing smooth and comfortable driving.

Next, the second gear ratio selecting means 40 outputs the shift change signal (shift down signal) to the first gear ratio selecting means 41 (Step S105). Then, the first gear ratio selecting means 41 outputs the gear changing command signal to the automatic transmission 12 (Step S106), whereupon the automatic transmission 12 changes gears in accordance with such command.

Next, a description of the downshift judgement routine will be given with reference to FIG. 7. The distance "d" calculated by the computing device S4 is read in (Step S201), and then a judgement is made as to whether or not the automobile has reached at a judgement point "G" (Step 5202). More specifically, the distance "d" is compared with the distance "D" which is a distance from the judgement position "G" to the specific position, and if it is found that "d" is less than or equal to "D", it is determined that the automobile has reached the judgement point "G".

In the case where it is determined that the automobile has already reached the judgement point "G", a judgement is made as to whether or not the accelerator is OFF (Step S203). At this judgement step, if it is determined that the accelerator is ON, the process proceeds to Step S209 described below, and if it is determined that the accelerator is OFF, a judgement is made as to whether or not the foot brake is being actuated (Step S204).

Figure 4:
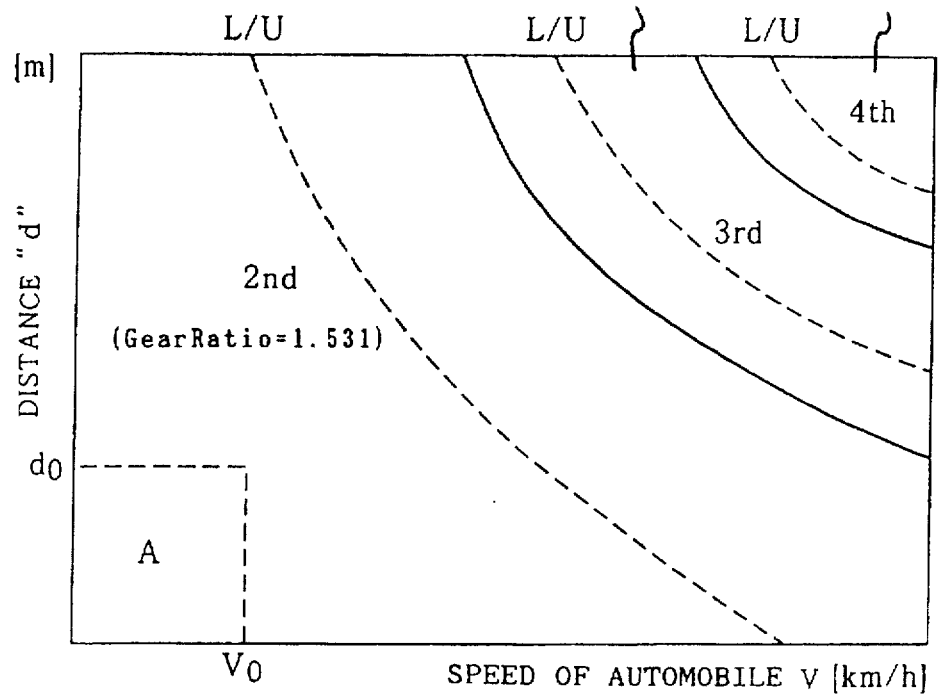
FIG. 4 is a second gear change table for determining the appropriate gear change after the automobile has passed a judgement point.

If it is determined that the foot brake is being actuated, the gear stage (that is the second gear ratio) which should be shifted into is determined from the distance "d" and the automobile speed V at that time based on the second gear change table shown in FIG. 4, and then this determined gear stage is compared with the present gear stage (that is the first gear ratio) to determine whether or not a downshift is required (Step S205). In the case where the second gear ratio is larger than the first gear ratio, a downshift is judged to be necessary.

On the other hand, in the case where the foot brake is not being actuated, a judgement is made as to whether or not a blinker is on (Step S206). In this regard, "a blinker is lit up" or "blinker is on" refers to thus situation in which the direction indicated by the blinker is in he direction of the planned driving route of the automobile. In other situations, that is for example in the case where a blinker which indicates a direction opposite to the direction of the planned driving route is on, a judgement "the blinker is not on" is made.

Figure 5:
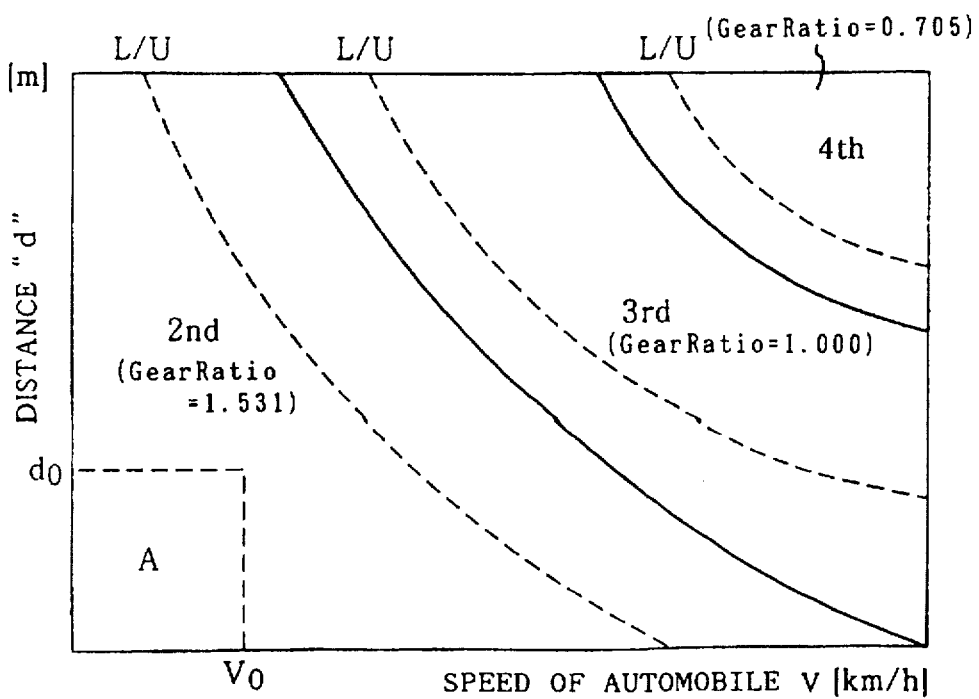
FIG. 5 is a third gear change table for determining the appropriate gear change after the automobile has passed a judgement point.

In the case where it is determined that the blinker is on, a gear stage (that is the second gear ratio) which should be shifted into is determined from the distance "d" and the automobile speed V at that time based on the third gear change table shown in FIG. 5, and the this determined gear stage is compared with the present gear stage (that is the first gear ratio) to determine whether or not a downshift is required (Step S207). In the case where the second gear ratio is larger than the first gear ratio, a downshift is judged to be necessary.

Figure 3:
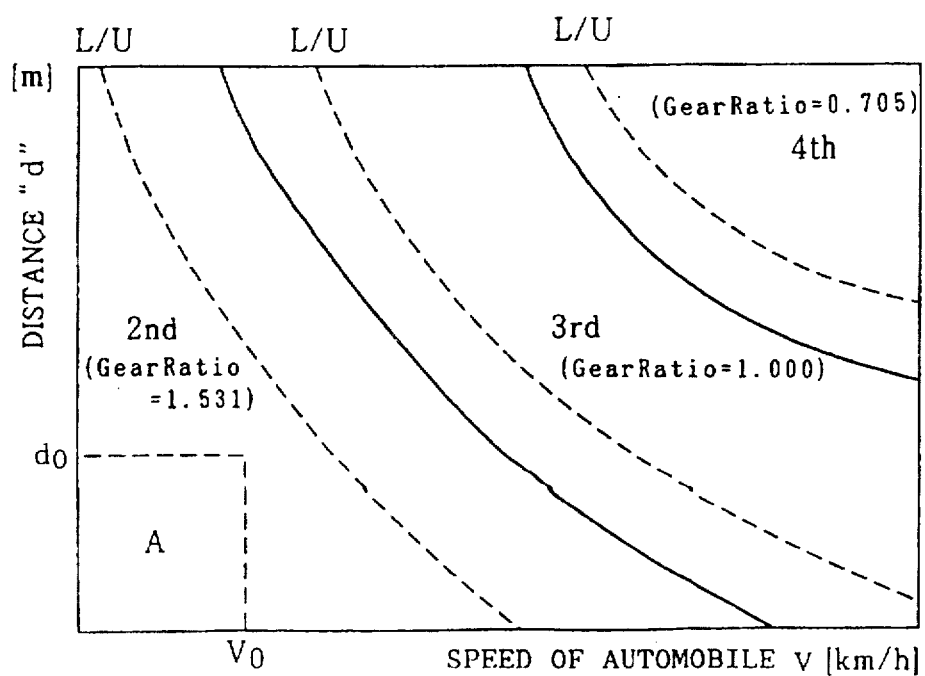
FIG. 3 is a first gear change table for determining the appropriate gear change after the automobile has passed a judgement point.

In the case where it is determined that the blinker is not on, a gear stage (that is the second gear ratio) which should be shifted into is determined from the distance "d" and the automobile speed V at that time based on the first gear change table shown in FIG. 3, and then this determined gear stage is compared with the present gear stage (that is the first gear ratio) to determine whether or not a downshift is required (Step S208). In the case where the second gear ratio is larger than the first gear ratio, a downshift is judged to be necessary.

By carrying out the Steps S202–S208, it is possible to smoothly reduce speed as the automobile approaches the specific position, thereby enabling smooth travel through the specific position at an appropriate speed.

After Steps S205, S207 and S208 have been completed, a judgement is made as to whether or not the driving conditions of the automobile lie within the respective range A shown in the first-third gear change tables (Stop S210). Namely, a judgement is made as to whether or not the distance between the automobile position and the specific position is less than or equal to d, and whether or not the automobile speed V is less than or equal to Vo. In other words a judgement is made as to whether or not the automobile is close to the specific position and whether or not the automobile speed has been sufficiently reduced.

In the case where the driving conditions do not lie within the range A, the process returns to the main routine, and Steps S201–S208 are repeated. In thus case where the driving conditions lie within the range A, an appropriate throttle opening degree θ which is to be used after passage through the specific position is estimated by taking into account the anticipated road conditions after passage through the specific position, such as the number of traffic lanes, the width of the road, the grade of the road and the like (Step S210).

Next, a first gear ratio is determined from the estimated throttle opening degree θ and the automobile speed V based on the normal driving conditions gear change table shown in FIG. 2 (Step S211).

By carrying out Steps S209–S211, it is possible to provide smooth driving in accordance with the road conditions, even after passage through the specific position, and in particular it is possible to drive at an increased speed.

Figure 8:
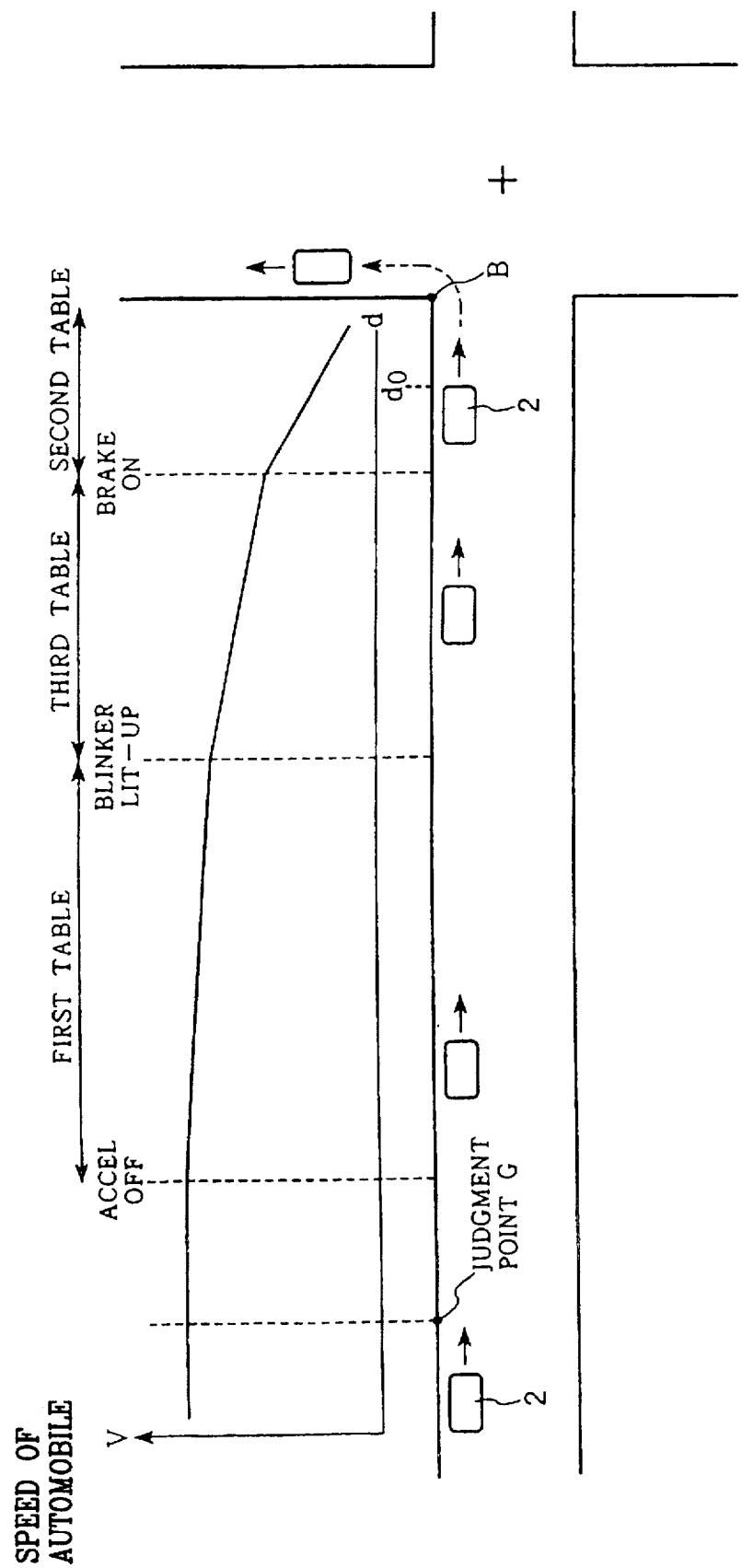
FIG. 8 is a schematic diagram showing the relationship between the automobile speed and location.

Next, with reference to FIG. 8, the above control operations for changing the speed of the automobile will be described, by way of example, for the case in which a left turn is to be made at an intersection.

Figure 7:
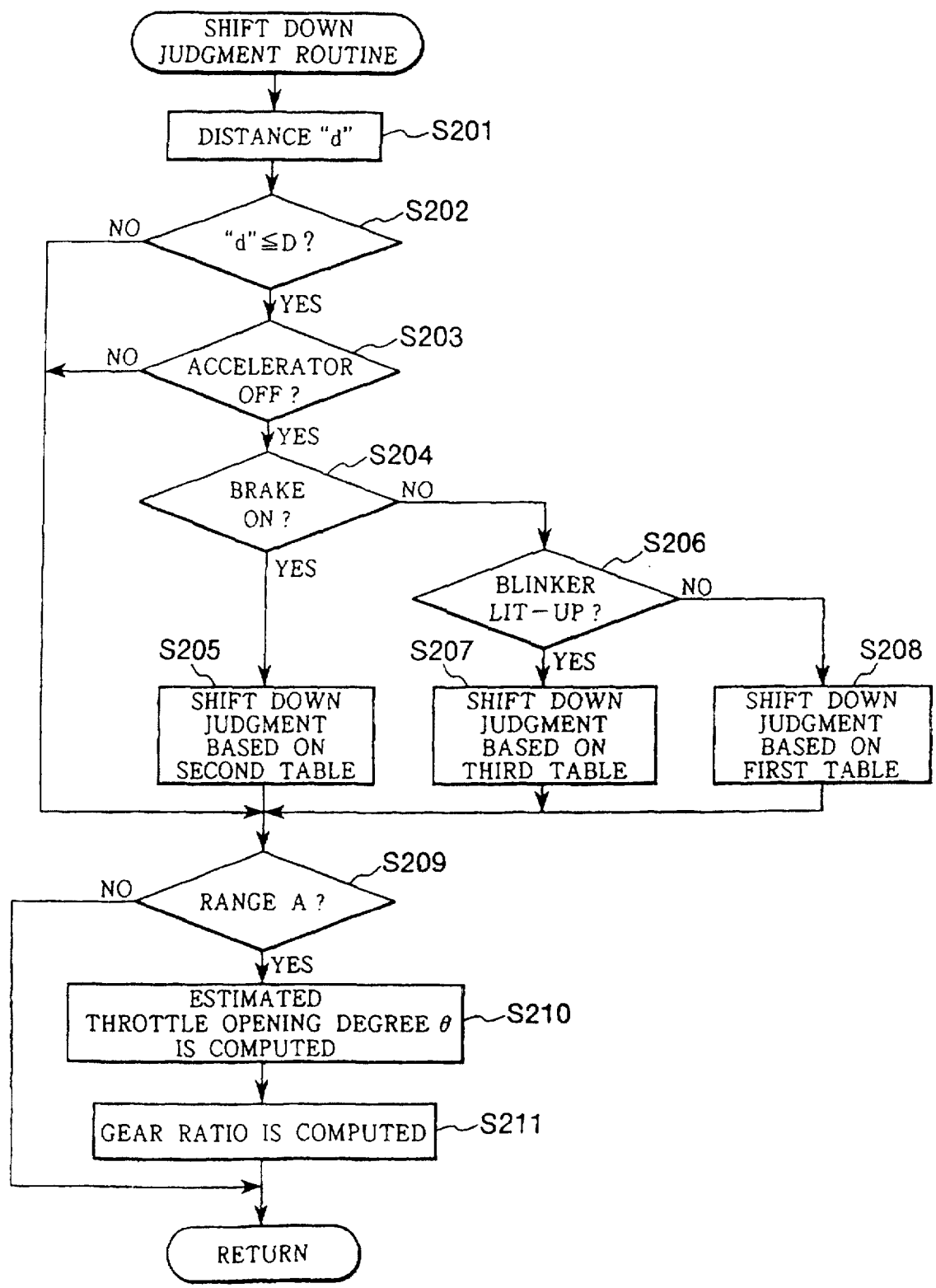
FIG. 7 is a flow chart for a downshift judgement subroutine for shift control.

As an automobile 2 passes through a judgement point (point G), that is located at a predetermined distance before an intersection (point B) which here is the specific position, Steps S203–S208 in the downshift judgement routine shown in FIG. 7 are ready to be executed.

If the accelerator is OFF, a downshift operation is carried out based on the first gear change table until the left blinker is turned on, so that the automobile speed V is gradually reduced due to the operation of the engine brake or the like.

Next, when the left blinker is turned on, a downshift operation is carried out based on the third gear change table until the foot brake is actuated, so that the automobile speed V is further reduced due to the operation of the engine brake or the like.

Then, when the foot brake is actuated, a downshift operation is carried out based on the second gear change table, so that the automobile speed V is further reduced due to the operations of both the engine brake and the foot brake.

Before such downshifting operations are automatically performed, a synthesized voice is used to give the driver of the automobile 2 advance notice of such downshifting operations in order to avoid confusing the driver by a sudden unexpected downshifting operation.

In this connection, it is to be noted that in the present invention it is also possible to use a synthesized voice to inform the driver that an impending reduction in speed may be made due to a downshifting by the gear change control after the automobile 2 has passed a judgement point "G".

When the automobile speed V has been sufficiently reduced and the automobile 2 passes the point at the distance do, the driving conditions enter the range A in the respective gear change tables shown in the drawings and the automobile 2 passes the specific position B. At this point, the automobile 2 begins travel on a wider road.

Then, by performing Steps S210 and S211, an estimated throttle opening degree θ is computed based on the information of the width of the road, and then an appropriate gear stage to be established is determined from the normal driving conditions gear change table shown in FIG. 2 based on the estimated throttle opening degree θ. This gear stage to be established is determined so as to be the most suitable for the automobile 2 to start increasing speed as the automobile begins travel on the wider road. For example, the gear stage is shifted into the first gear so that the automobile 2 can smoothly and quickly travel at an increased speed.

Further, according to this embodiment, since downshifting is carried out successively, it is possible to downshift into second or first gear, which makes it possible for the engine brake to be sufficiently effective.

Furthermore, it is possible to provide a steering angle sensor in the automobile in order to detect whether or not the automobile is moving straight. In this case, downshifting operations are not carried out when the sensor detects that the automobile is not moving straight ahead. With such control operations, it is possible to ensure even smoother driving conditions. In accordance with factors such as the current automobile speed and road surface conditions, it is possible to change the steering angle range which determines whether or not a downshifting operation is to be carried out. For example, when the automobile speed is low, the steering angle at which downshifting is permitted can be made large, and when the automobile speed is high, the steering angle at which downshifting is permitted can be made small. Similarly, when the road surface has a high coefficient of friction, the steering angle at which downshifting is permitted can be made large, and when the road surface has a low coefficient of friction, the steering angle at which downshifting is permitted can be made small.

The voice output device 5 can be constructed so as to output a voice notice that informs the driver of an impending downshift before such a downshift operation is carried out, even before the automobile passes the judgement point "G" under normal driving conditions. For example, when a gear change is to be carried out by the first gear ratio selecting means 41, the voice output device 5 can output a voice notice such as "shifting up into third gear" when shifting up into third gear, for example, and a voice notice such as "shifting down into second gear" when shifting down into second gear, for example.

In addition to such voice messages, the following information can also be announced to the driver in the form of voice messages:

(1) When a lockup clutch for the automatic transmission 12 is actuated, the voice output device 5 can output an advance voice notice such as "Operating the lockup clutch", for example.

(2) When the automobile is provided with a brightness sensor to enable the headlights of the automobile to be turned ON/OFF automatically in accordance with the level of brightness detected by the brightness sensor, the voice output device 5 can output an advance voice notice such as "Turning on headlights", for example, before turning on the headlights, and "Turning off headlights", for example, before turning off the headlights.

(3) When switching on AUTO air conditioning, the voice, output device 5 can output an advance voice notice such as "The temperature will be lowered", for example.

(4) Before activating the anti-lock brake system, the voice output device 5 can output an advance voice notice such as "Now activating ABS", for example.

(5) Before carrying out traction control, the voice output device 5 can output an advance voice notice such as "Now activating traction control", for example.

(6) When switching to 4WD, the voice output device can output an advance voice notice such as "Switching to four wheel drive", for example.

(7) When switching 4WS (Four Wheel Steering) between the same phase and the antiphase according to the speed of a automobile, the voice output device 5 can output an advance voice notice such as "Switching to antiphase", for example.

(8) When employing a system for changing the steering assistance force of power steering in accordance with the speed of the automobile, the voice output device 5 can output an advance voice notice such as "Increasing steering force", for example before the system is to be actuated.

(9) When the automobile is provided with a rain drop sensor to enable the wipers of the automobile to be operated automatically when rain drops are detected, the voice output device 5 can output an advance voice notice such as "Operating wipers", for example.

In this way, by outputting advance voice notices to the driver of the automobile, it is possible to inform the driver of operations that will be carried out. In particular, when these automatic operations are carried out in an automobile, there are many cases in which the driver does not know what is going on. Therefore, by giving the driver voice notices of such operations before they are carried out, the driver can continue driving comfortably, and this makes it possible to ensure even smoother driving conditions.

In this way, by giving the driver of the automobile such voice notice as described above, the driver is made properly aware of the next operation, in accordance with the content of the voice notice.

As described above, according to the present invention, it is possible to carry out gear changes control by taking anticipated changes in the driving conditions into account, thus making it possible to achieve more smooth and comfortable driving as compared to the prior art.

For example, by computing the distance from the automobile position to a specific position on the planned driving route, it is possible to carry out a downshifting operation, based on such computed distance and the automobile speed, before reaching the specific position, whereby it becomes possible to smoothly pass through the specific position at an appropriate speed.

Furthermore, by previously establishing a driving route to a destination utilizing a driving route search means, it is possible to further clearly establish specific positions, and this makes it possible to provide for even smoother driving.

Moreover, by providing the driver of the automobile with advance voice notice of control operations to be carried out, it is possible to avoid confusing the driver by unexpected control operations, thus leading to more comfortable driving.

Further, it is to be noted that the notice means in the present invention is not limited to the voice notice generating means described above, as it is also possible to employ other notice generating means such as an electric sound emitting device such as a buzzer, a light emitting element (e.g., an LED), a display device such as a liquid crystal display or any combination of these devices with the voice notice generating device described above.

Finally, it should be noted that the present invention in not limited to the embodiments described above. The scope of the present invention is determined only by the following claims and therefore changes and modifications can be made without departing from the scope of the claims.

What is claimed is:

1. An apparatus for controlling an automatic transmission of an automobile, comprising:

road information storing means for storing information concerning roads;

specific position detecting means for detecting a specific position, which is located on a planned driving route, from the road information stored in said road information storing means;

location detecting means for detecting present location of the automobile;

distance computing means for computing distance between the detected present location of the automobile and the specific position;

speed detecting means for detecting speed of the automobile;

an accelerator sensor for detecting an off position of an accelerator and for generating an accelerator OFF signal;

first gear ratio selecting means for selecting an appropriate gear ratio for the automatic transmission by reference to a prestored gear change table, responsive to receipt of a demand signal; and second gear ratio selecting means including determining means for determining, responsive to the computed distance reaching a predetermined distances, whether or not a downshift is needed by comparing a present gear ratio with a gear ratio determined in accordance with the detected speed and the computed distance when the accelerator sensor generates the accelerator OFF signal, said second gear ratio selecting means outputting a downshift demand signal to the first gear ratio selecting means responsive to a determination that a downshift is needed.

2. The apparatus as claimed in claim 1, further comprising a shift lever position sensor for detecting position of a shift lever, wherein said second gear ratio selecting means outputs the downshift demand signal only when the shift lever is detected to be in a drive position.

3. The apparatus as claimed claim 1, wherein said second gear ratio selecting means determines whether or not the detected speed and the distance between the specific position and the detected present location of the automobile are equal to or less than respective predetermined values and estimates a throttle opening degree θ for travel beyond the specific position when they become equal to or less than the respective predetermined values.

4. The apparatus as claimed in claim 3, wherein said first gear ratio selecting means selects the appropriate gear ratio based on the estimated throttle opening degree θ.

5. The apparatus as claimed in claim 1, further comprising driving route search means for searching the stored information concerning roads to determine this planned driving route to a destination.

6. The apparatus as claimed in claim 1, wherein said specific position is an intersection, a point of entry into a curve, a railroad crossing, an expressway off ramp, a tollgate, the point where a road narrows, the beginning of an upgrade or the beginning of a downgrade.

7. An apparatus for controlling an automatic transmission of an automobile, comprising:

road information storing means for storing information concerning roads;

specific position detecting means for detecting a specific position, which is located on a planned driving route, from the road information stored in said road information storing means;

location detecting means for detecting present location of the automobile;

distance computing means for computing distance between the detected present location of the automobile and the specific position;

speed detecting means for detecting speed of the automobile;

a brake sensor for detecting actuation of a brake and for generating a brake ON signal;

first gear ratio selecting means for selecting an appropriate gear ratio for the automatic transmission by reference to a prestored gear change table, responsive to receipt of a demand signal; and second gear ratio selecting means including determining means for determining, responsive to the computed distance reaching a predetermined distance, whether or not a downshift is needed by comparing a present gear ratio with a gear ratio determined in accordance with the detected speed and the computed distance, when the brake sensor generates the brake ON signal, said second gear ratio selecting means outputting a downshift demand signal to the first gear ratio selecting means responsive to a determination that a downshift is needed.

8. The apparatus as claimed in claim 7, further comprising a shift lever position sensor for detecting position of a shift lever, wherein said second gear ratio selecting means outputs the downshift demand signal only when the shift lever is detected to be in a drive position.

9. The apparatus as claimed claim 7, wherein said second gear ratio selecting means determines whether or not the detected speed and the distance between the specific position and the detected present location of the automobile are equal to or less than respective predetermined values and estimates a throttle opening degree θ for travel beyond the specific position when they become equal to or less than the respective predetermined values.

10. The apparatus as claimed in claim 9, wherein said first gear ratio selecting means selects the appropriate gear ratio based on the estimated throttle opening degree θ.

11. The apparatus as claimed in claim 7, further comprising driving route search means for searching the stored information concerning roads to determine the planned driving route to a destination.

12. The apparatus as claimed in claim 7, wherein said specific position is an intersection, a point of entry into a curve, a railroad crossing, an expressway off ramp, a tollgate, the point where a road narrows, the beginning of an upgrade or the beginning of a downgrade.

13. An apparatus for controlling an automatic transmission of an automobile, comprising:

road information storing means for storing information concerning roads;

specific position detecting means for detecting a specific position, which is located on a planned driving route, from the road information stored in said road information storing means;

location detecting means for detecting present location of the automobile;

distance computing means for computing distance between the detected present location of the automobile and the specific position;

speed detecting means for detecting speed of the automobile;

an accelerator sensor for detecting an OFF position of an accelerator for the automobile and for generating an accelerator OFF signal;

a brake sensor for detecting actuation of a brake and for generating a brake ON signal;

first gear ratio selecting means for selecting an appropriate gear ratio for the automatic transmission by reference to a prestored gear change table, responsive to receipt of a demand signal; and second gear ratio selecting means including determining means for determining, responsive to the computed distance reaching a predetermined distance, whether or not a downshift is needed by comparing a present gear ratio with a gear ratio determined in accordance with the detected speed and the computed distance, when the accelerator sensor generates the accelerator OFF signal but the brake sensor does not generate the brake ON signal, or when the accelerator sensor generates the accelerator OFF signal and the brake sensor generates the brake ON signal, said second gear ratio selecting means outputting a downshift demand signal to the first gear ratio selecting means when it determines that a downshift is needed.

14. The apparatus as claimed in claim 13, wherein said determining means of said second gear ratio selecting means includes:

a first determining means for determining whether or not a downshift is needed by comparing the present gear ratio with a gear ratio which is determined by reference to the prestored gear change tables, when the accelerator generates the accelerator OFF signal but the brake sensor does not generate the brake ON signal; and a second determining means for determining whether or not a downshift is needed by comparing the present gear ratio with a gear ratio which is determined by reference to the prestored gear change tables, when the accelerator generates the accelerator OFF signal and the brake sensor generates the brake ON signal.

15. The automobile controlling apparatus as claimed in claim 13, further comprising a shift lever position sensor for detecting position of the shift lever, wherein said second gear ratio selecting means outputs the downshift demand signal only when the shift lever is detected to be in a drive position.

16. The automobile controlling apparatus as claimed in claim 13, wherein said second gear ratio selecting means determines whether or not the detected speed and the distance between the specific position and the detected present location of the automobile are equal to or less than respective predetermined values and estimates a throttle opening degree θ for travel beyond the specific position when they become equal to or less than the respective predetermined values.

17. The automobile controlling apparatus as claimed in claim 16, wherein said first gear ratio selecting means selects the appropriate gear ratio based on the estimated throttle opening degree θ.

18. The automobile controlling apparatus as claimed in claim 13, further comprising driving route search means for searching the stored information concerning roads to determine the planned driving route to a destination.

19. The automobile controlling apparatus as claimed in claim 13, wherein said specific position is an intersection, a point of entry into a curve, a railroad crossing, an expressway off ramp, a tollgate, the point where a road narrows, the beginning of an upgrade or the beginning of a downgrade.

* * * * *

UNITED STATES PATENT AND TRADEMARK OFFICE
CERTIFICATE OF CORRECTION

PATENT NO. : 5,893,894
DATED : April 13, 1999
INVENTOR(S) : MOROTO et al

It is certified that error appears in the above-indentified patent and that said Letters Patent is hereby corrected as shown below:

Col. 3, line 2, delete "the," insert --the--; and
      line 4, delete "oat" insert --of--.

Col. 7, line 27, delete "established" insert --established,--.

Col. 8, line 34, delete "Includes" insert --includes--.

Col. 9, line 52, delete "he" insert --the--.

Col. 10, line 28, delete "thus" insert --the--.

Col. 12, line 51, delete "changes" insert --change--.

Col. 14, line 3, delete "this" insert --the--.

Signed and Sealed this

Second Day of November, 1999

Attest:

Q. TODD DICKINSON

Attesting Officer     Acting Commissioner of Patents and Trademarks